United States Patent
Hull et al.

(10) Patent No.: US 9,884,593 B2
(45) Date of Patent: Feb. 6, 2018

(54) WEAPON MOUNTING SYSTEM

(71) Applicant: Pro-gard Products, LLC, Indianapolis, IN (US)

(72) Inventors: Brian Hull, Zionsville, IN (US); Mike Navarro, Noblesville, IN (US); John Eichhorn, Indianapolis, IN (US)

(73) Assignee: Pro-gard Products, LLC, Indianapolis, IN (US)

( * ) Notice: Subject to any disclaimer, the term of this patent is extended or adjusted under 35 U.S.C. 154(b) by 146 days.

(21) Appl. No.: 14/621,086

(22) Filed: Feb. 12, 2015

(65) Prior Publication Data

US 2016/0238337 A1  Aug. 18, 2016

(51) Int. Cl.

| | | |
|---|---|---|
| A47F 5/00 | (2006.01) | |
| A47F 7/00 | (2006.01) | |
| B60R 7/14 | (2006.01) | |
| A47B 57/26 | (2006.01) | |
| A47B 57/54 | (2006.01) | |
| A47B 57/56 | (2006.01) | |
| A47B 81/00 | (2006.01) | |
| A47B 57/18 | (2006.01) | |
| A47B 96/14 | (2006.01) | |
| A47F 5/06 | (2006.01) | |

(52) U.S. Cl.
CPC .............. B60R 7/14 (2013.01); A47B 57/18 (2013.01); A47B 57/265 (2013.01); A47B 57/545 (2013.01); A47B 57/565 (2013.01); A47B 81/005 (2013.01); A47B 96/1416 (2013.01); A47B 96/1466 (2013.01); A47B 96/1475 (2013.01); A47B 96/1483 (2013.01); A47F 5/06 (2013.01)

(58) Field of Classification Search
CPC ......... E05B 73/00; E05B 69/006; B60R 7/04; B60R 7/14; B60R 7/08; B60R 7/00; A47F 7/0021; A47F 7/0028; A47F 5/10; A47F 5/108; A47F 5/04; A47F 5/06; A47F 7/024; A47F 3/002; A47B 57/54; A47B 57/545; A47B 57/56; A47B 57/562; A47B 57/30; A47B 57/34; A47B 57/42; A47B 57/44; A47B 57/46; A47B 57/18; A47B 57/26; A47B 57/265; A47B 57/565; A47B 47/00; A47B 57/00; A47B 57/06; A47B 57/10; A47B 81/005; A47B 81/00; A47B 45/00; A47B 96/025; A47B 96/14; A47B 96/1416; A47B 96/1466; A47B 96/1475; A47B 96/1483; A47B 2096/1491
USPC ............ 211/64, 175, 70.6, 196, 205, 189, 4; 224/275, 552, 553, 547, 567, 569, 570, 224/571, 913; D6/552; 89/37.01; 42/94
See application file for complete search history.

(56) References Cited

U.S. PATENT DOCUMENTS

| | | | | |
|---|---|---|---|---|
| 2,158,623 A | * | 5/1939 | Fischbacher | ......... A47B 81/005 |
| | | | | 206/317 |
| 2,535,564 A | | 12/1950 | Campbell | |
| 2,783,896 A | * | 3/1957 | Agostini | ................... B60R 7/14 |
| | | | | 211/64 |
| 3,917,071 A | * | 11/1975 | Walters | ................... E05B 73/00 |
| | | | | 211/4 |

(Continued)

*Primary Examiner* — Jennifer E. Novosad
(74) *Attorney, Agent, or Firm* — Faegre Baker Daniels LLP

(57) ABSTRACT

A weapon mounting system including a base and an upright for supporting a weapon holder. The weapon holder is supported for sliding movement along the upright.

20 Claims, 14 Drawing Sheets

(56) References Cited

U.S. PATENT DOCUMENTS

| | | | | |
|---|---|---|---|---|
| 4,132,315 | A * | 1/1979 | Young | E05B 73/00 211/4 |
| 4,474,116 | A * | 10/1984 | Castenada, Jr. | A45C 13/20 109/50 |
| 4,641,755 | A * | 2/1987 | Oliver | F42B 39/28 206/3 |
| 4,747,280 | A | 5/1988 | Shaw | |
| 4,936,531 | A * | 6/1990 | Bauser | B60N 3/00 211/64 |
| 4,949,559 | A | 8/1990 | Glines | |
| 5,138,786 | A * | 8/1992 | Fischer | F41A 17/02 211/64 |
| 5,738,020 | A * | 4/1998 | Correia | A47B 95/008 109/51 |
| 5,816,546 | A | 10/1998 | Miller | |
| D401,213 | S * | 11/1998 | Inchaurregui | D12/406 |
| 5,979,846 | A * | 11/1999 | Fluhr | B60R 7/14 211/64 |
| 6,129,252 | A * | 10/2000 | Jackson | B60R 7/14 114/351 |
| 6,427,497 | B1 * | 8/2002 | Mossberg, Jr. | A47B 81/005 211/4 |
| 6,935,065 | B1 * | 8/2005 | Oliver | F41A 23/04 211/64 |
| 6,986,446 | B2 * | 1/2006 | Murray | B60R 7/14 211/64 |
| 7,137,511 | B1 * | 11/2006 | Crowell | F41A 23/18 211/4 |
| D574,124 | S * | 7/2008 | Huber | D99/28 |
| D611,558 | S * | 3/2010 | Freeman | D22/108 |
| 7,770,740 | B2 * | 8/2010 | Punzel | A47B 81/005 211/64 |
| 8,074,477 | B1 * | 12/2011 | Weiche | F41C 33/06 211/64 |
| 8,678,206 | B2 * | 3/2014 | Kubiniec | A47B 81/005 211/64 |
| 8,910,560 | B2 * | 12/2014 | Irwin | F41A 23/005 211/4 |
| 8,950,596 | B2 * | 2/2015 | Arabian | B60R 7/14 211/64 |
| 2004/0045329 | A1 * | 3/2004 | Farnham | E05B 73/0005 70/63 |
| 2006/0113341 | A1 | 6/2006 | Murray et al. | |
| 2007/0277713 | A1 * | 12/2007 | Miresmaili | E05B 73/00 109/51 |
| 2008/0252414 | A1 * | 10/2008 | Crigger | G07C 9/00158 340/5.52 |
| 2011/0168649 | A1 * | 7/2011 | Stolz | A47B 81/005 211/4 |
| 2012/0005935 | A1 * | 1/2012 | Chandler | F41A 17/04 42/70.11 |
| 2013/0220947 | A1 * | 8/2013 | Pintur | A47F 5/0018 211/1 |
| 2014/0231480 | A1 | 8/2014 | Baker | |
| 2016/0238337 | A1 * | 8/2016 | Hull | B60R 7/14 |

* cited by examiner

WEAPON MOUNTING SYSTEM

BACKGROUND AND SUMMARY OF THE DISCLOSURE

The present invention relates generally to weapon holders and, more particularly, to mounting devices for supporting weapons within the passenger compartment of an automotive vehicle.

Weapon mounting systems, or gun racks, for supporting weapons inside of passenger compartments of automotive vehicles are well-known in the art. The prior art teaches that such gun racks may be mounted against a window, a screen, or a wall of a vehicle in order to support a weapon in a generally horizontal manner. In addition, it is known to provide vehicle gun racks for supporting a gun in an upstanding position, as illustrated in U.S. Pat. No. 4,747,280 to Shaw.

It is also known to provide a gun rack for supporting a gun adjacent to the ceiling of a vehicle passenger compartment, particularly for the purposes of concealing the gun and for providing access to the gun carried by the gun rack to a person in a front seat of the vehicle. For example, U.S. Pat. No. 5,816,546 to Miller, which is assigned to the assignee of the present invention, and is expressly incorporated by reference herein, discloses an illustrative clamp for a vehicle gun rack.

Additional illustrative prior art weapon mounting systems are disclosed in U.S. Pat. No. 6,986,446 to Murray et al., which is assigned to the assignee of the present invention, and is expressly incorporated by reference herein.

According to an illustrative embodiment of the present disclosure, a weapon mounting system includes an upright extending upwardly relative to a floor of a vehicle. The upright includes a lower end, an upper end, a first track extending between the lower end and the upper end, and a second track spaced apart from the first track and extending between the lower end and the upper end. A first weapon holder is supported by the upright. A first slide mount is received within the first track of the upright end is coupled to the first weapon holder. The first slide mount is supported by the track for sliding movement in a released mode of operation, and is secured in position in a fixed mode of operation. The first weapon holder is vertically moveable along the upright when the first slide mount is in the released mode of operation. An article lockbox is coupled to the upright.

According to a further illustrative embodiment of the present disclosure, a weapon mounting system includes an upright, the upright including a lower end, an upper end, a first track extending between the lower end and the upper end, and a second track extending between the lower end and the upper end. A first weapon holder is supported by the upright. A first slide mount is received within the first track and is coupled to the first weapon holder, wherein the first weapon holder is adjustable along the upright. A second weapon holder is supported by the upright. A second slide mount is received within the second track and is coupled to the second weapon holder, wherein the second weapon holder is adjustable along the upright independent of the first weapon holder. The second weapon holder is in laterally spaced relation to the first weapon holder such that the second weapon holder may be positioned horizontally adjacent to the first weapon holder without interference therebetween.

According to another illustrative embodiment of the present disclosure, a weapon mounting system includes a base member configured to be supported by a floor of a vehicle and an upright extending upwardly from the base member in a vertical direction. The upright includes a lower end, an upper end, a front face, a rear face, a first side face, and a second side face. A first track extends between the lower end and the upper end in the first side face, a second track extends between the lower end and the upper end in the second side face, and a third track extends between the lower end and the upper end in the front face. A first weapon holder is supported by the upright. A first slide mount is received within the first track and is coupled to the first weapon holder, wherein the first weapon holder is adjustable along the upright. A second weapon holder is supported by the upright. A second slide mount is received within the second track and is coupled to the second weapon holder, wherein the second weapon holder is adjustable along the upright. An article lock box is supported by the upright. A third mount is received within the third track and is coupled to the article lock box, wherein the article lock box is adjustable along the upright. The article lock box includes a housing, a lid coupled to the housing for pivoting movement between a closed position and an open position, and a lock to secure the lid in the closed position.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments elected for description have been chosen to enable one skilled in the art to practice the invention.

Figure 1:
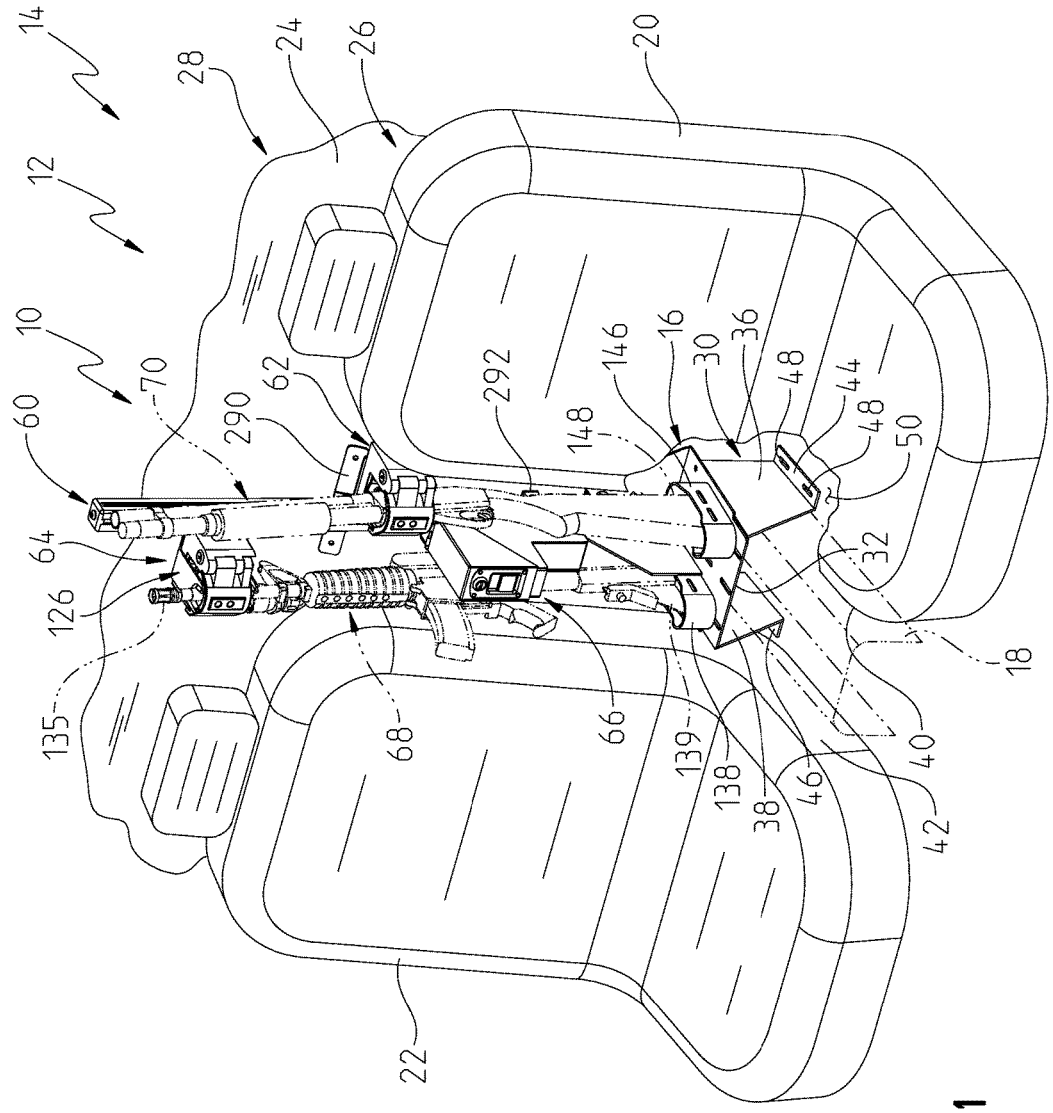
FIG. 1 is a perspective view of a weapon mounting system of the present disclosure installed within the passenger compartment of a vehicle, illustrating in phantom first and second weapons installed within weapon holders.

Referring initially to FIG. 1, an illustrative weapon mounting system 10 is shown positioned within the passenger compartment 12 of a vehicle 14. The weapon mounting system 10 illustratively includes a base 16 configured to straddle the conventional drive shaft hump 18 of the vehicle 14 intermediate a front driver seat 20 and a front passenger seat 22. If vehicle 14 includes a partition or barrier 24 separating front and rear occupant areas 26 and 28, the base 16 is positioned forward of the partition 24. The base 16 may be tailored to mount within different vehicle types and models.

The base 16 illustratively includes a support 30 including a mounting platform 32 having a substantially planar support surface with a plurality of mounting openings 34. First and second sidewalls 36 and 38 extend downwardly from the support 30 along opposing sides of the drive shaft hump 18 and proximate inner side edges 40 and 42 of the front driver seat 20 and the front passenger seat 22, respectively. As such, the mounting platform 32 extends between the first and second sidewalls 36 and 38 and is configured to extend above the drive shaft hump 18.

The base 16 further includes first and second mounting members 44 and 46 which extend outwardly from lower ends of the first and second sidewalls 36 and 38, respectively. The first and second mounting members 44 and 46 each illustratively include mounting apertures 48 for securing the base 16 to the floor 50 of the vehicle 14. The mounting apertures 48 are illustratively formed as elongated slots in order to facilitate installation of the weapon mounting system 10 and to permit adjustment of the weapon mounting system 10 to a desired position. More particularly, the mounting aperture 48 of the first mounting member 44 is adapted to receive a driver seat mounting stud (not shown), while the mounting aperture 48 of the second mounting member 46 is adapted to receive a front passenger seat mounting stud (not shown). Illustratively, the driver seat mounting stud is positioned proximate of the right rear corner of the driver seat 20, while the front passenger seat mounting stud is positioned proximate the left rear corner of the passenger seat 22. Conventional nuts (not shown) may threadably receive the respective mounting studs for securing the first and second mounting members 44 and 46 to the floor 50 of the vehicle 14.

An upright 60 illustratively extends upwardly from the base 16 in a generally vertical direction and is coupled to the mounting platform 32. A plurality of accessory supports or mounts are supported by the upright 60. The accessory supports illustratively include a first weapon holder 62, a second weapon holder 64 and an article lock box 66. As further detailed herein, the first and second weapon holders 62 and 64 may secure a plurality of different weapons, illustratively long guns, to the weapon mounting system 10. As shown in the illustrative embodiment of FIG. 1, the first weapon holder 62 may secure a rifle 68, such as M4 carbine rifle, while the second weapon holder 64 may secure a shotgun 70, such as Remington Model 870 shotgun. As further detailed herein, the article lock box 66 may be used to secure a variety of articles, including a handgun.

Figure 5:
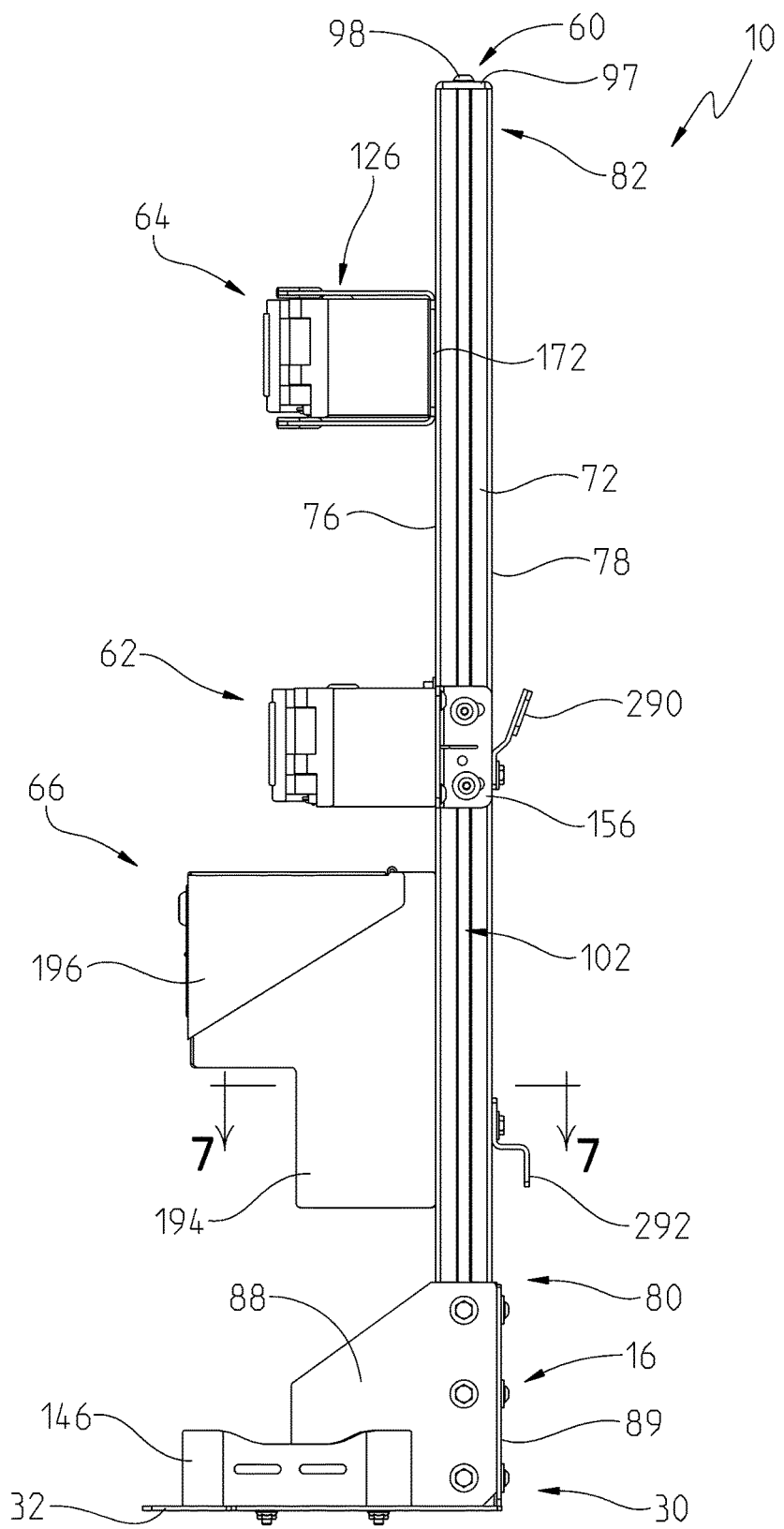
FIG. 5 is a side elevational view of the weapon mounting system of FIG. 1.
Figure 7:
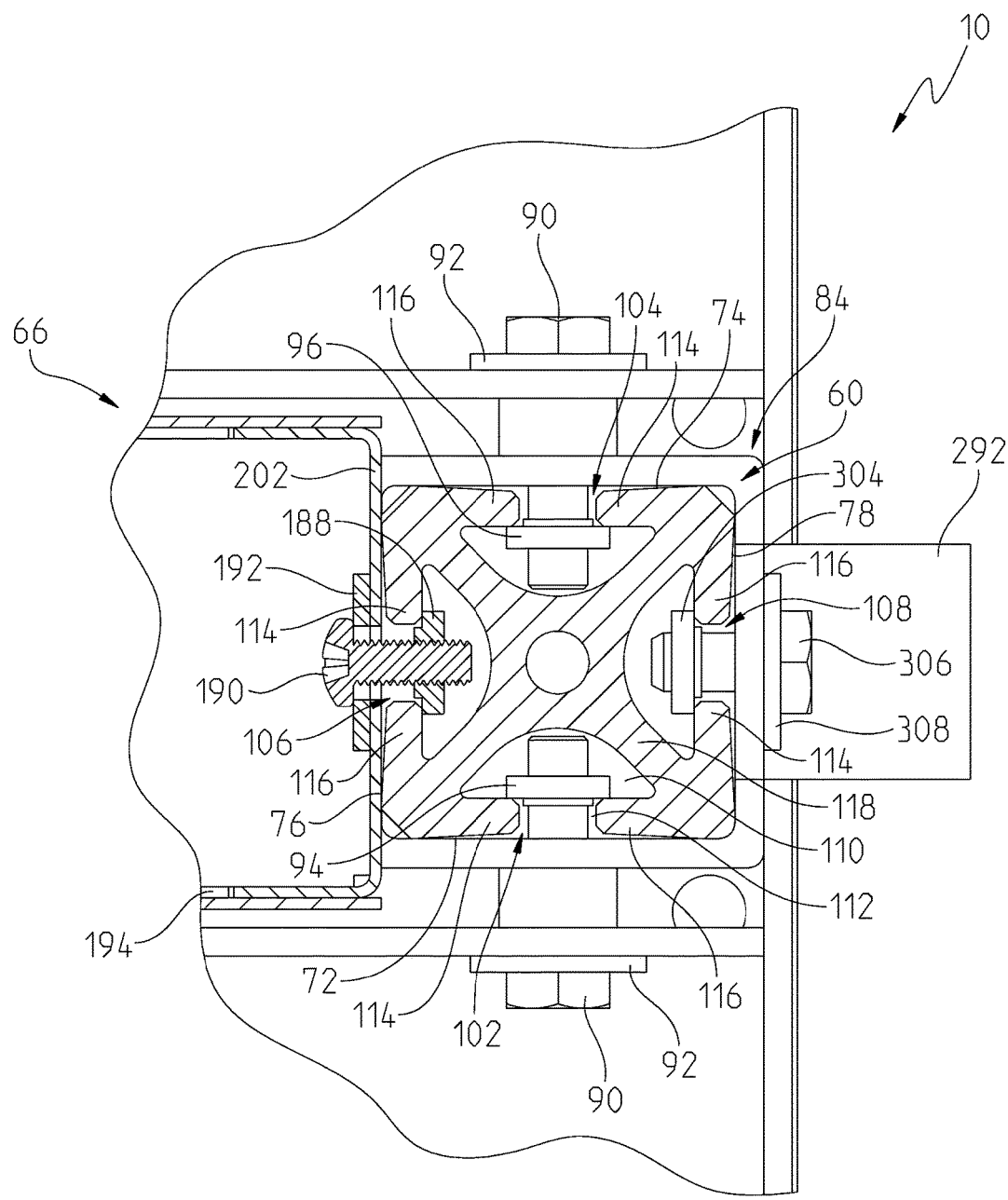
FIG. 7 is a cross-sectional view taken along line 7-7 of FIG. 5.
Figure 8:
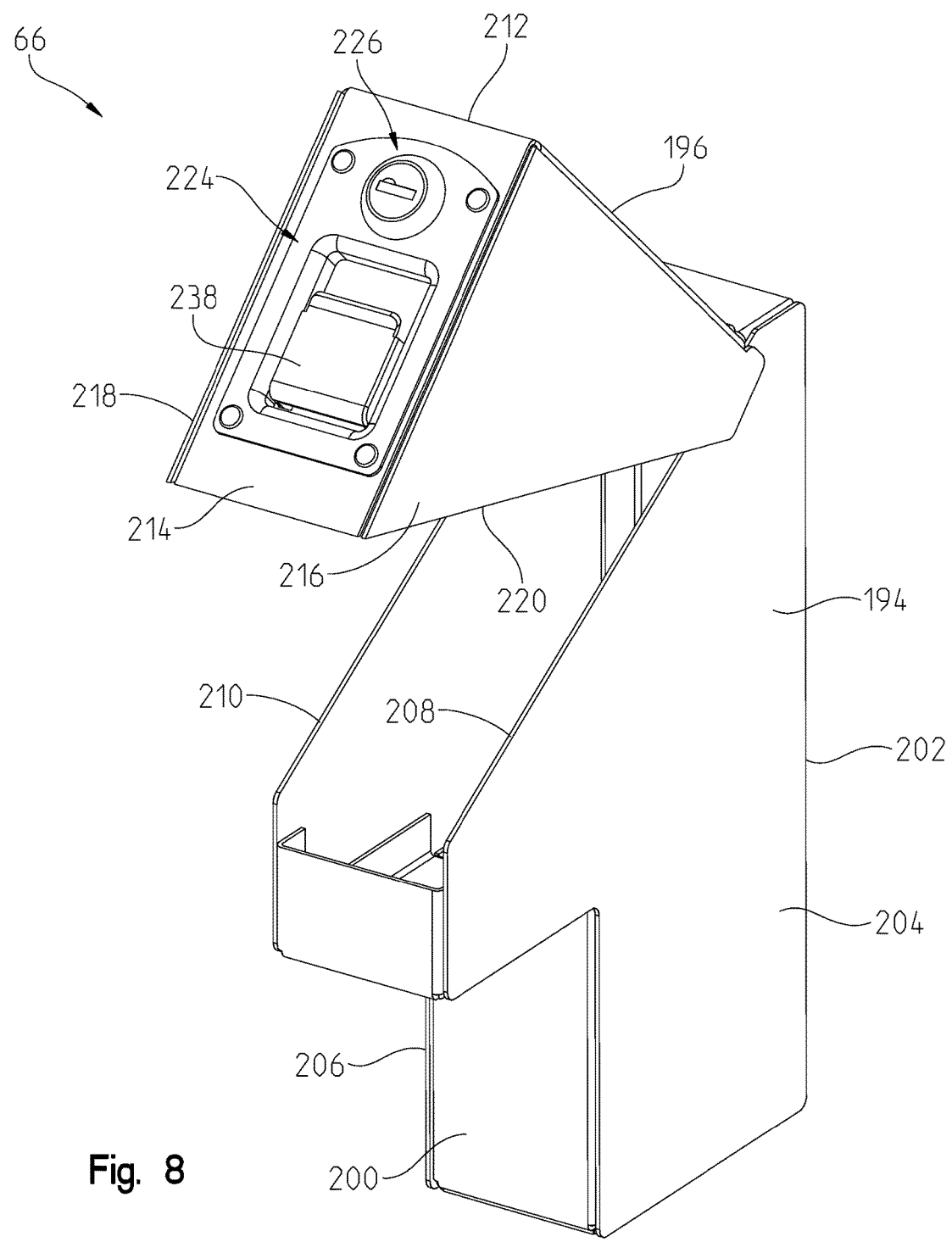
FIG. 8 is a front perspective view of the article lock box of FIG. 1, with the lid in an open position.
Figure 9:
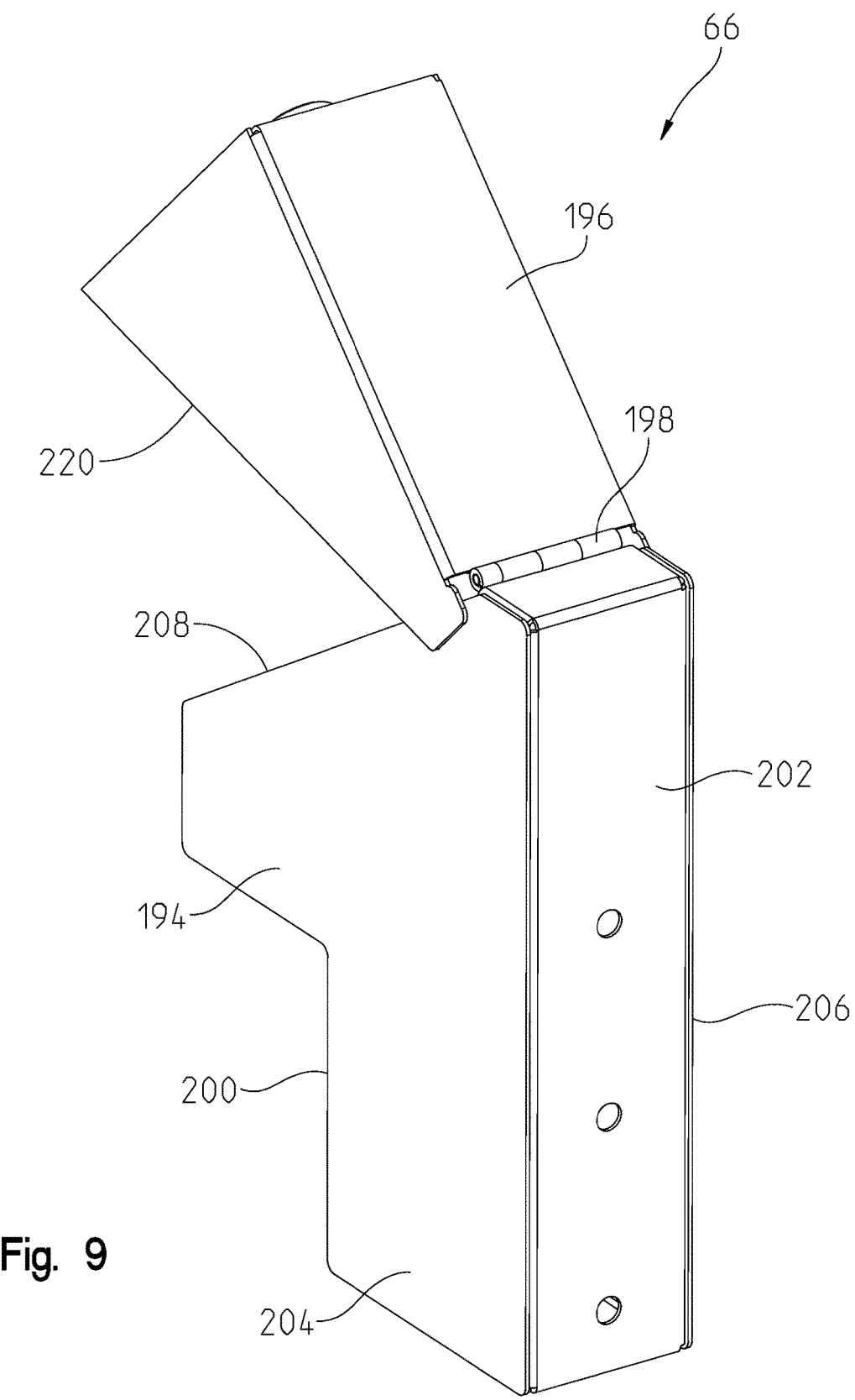
FIG. 9 is a rear perspective view of the article lock box of FIG. 8.

With reference to FIGS. 5 and 7, the upright 60 illustratively includes a substantially rectangular cross-section having a first side face 72, a second side face 74, a front face 76, and a rear face 78. The upright 60 may be formed of a metal, such as an extruded aluminum, extending between a lower end 80 and an upper end 82.

Figure 6A:
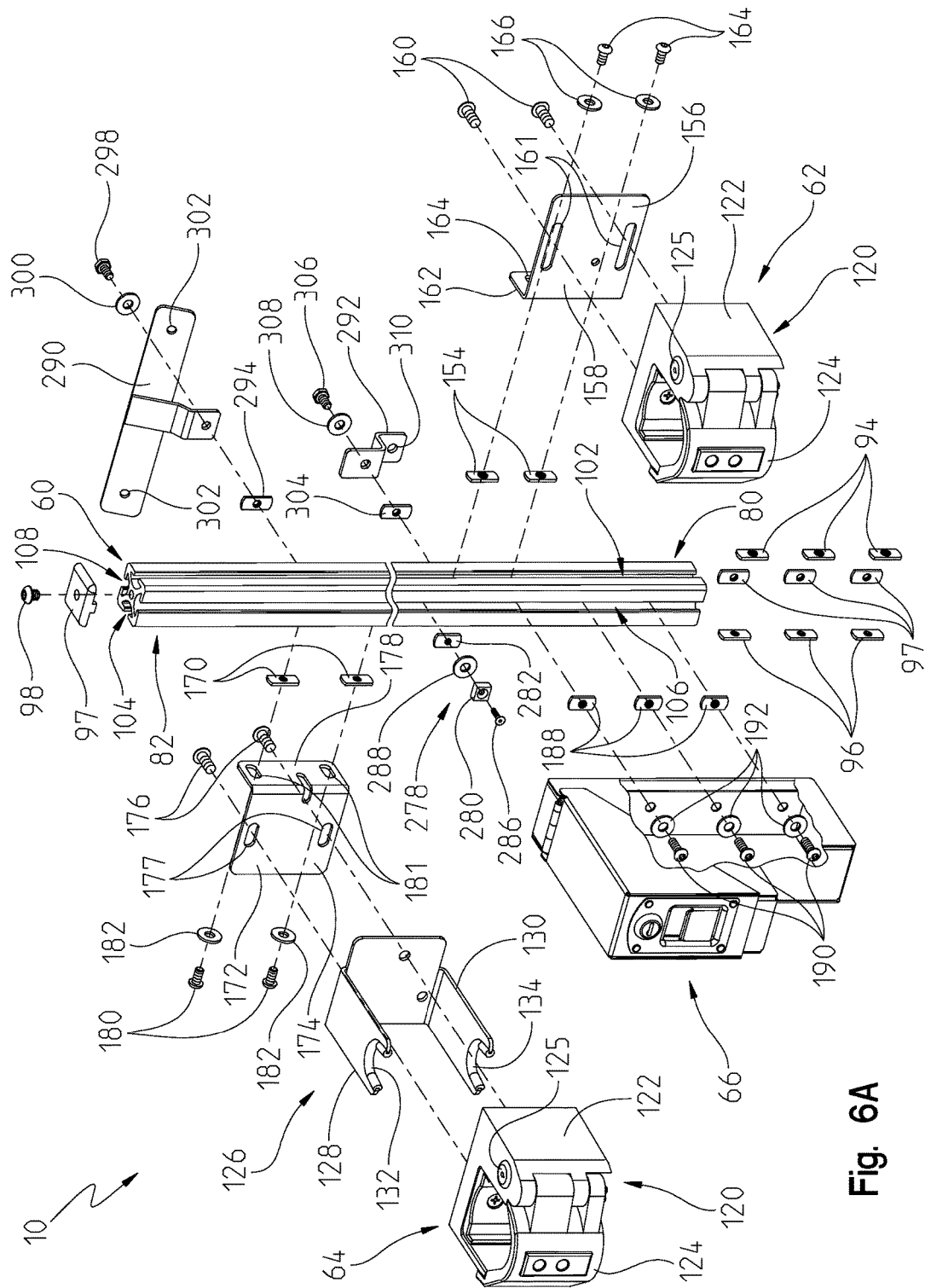
FIG. 6A is an exploded perspective view of the upper portion of the weapon mounting system of FIG. 1.
Figure 6B:
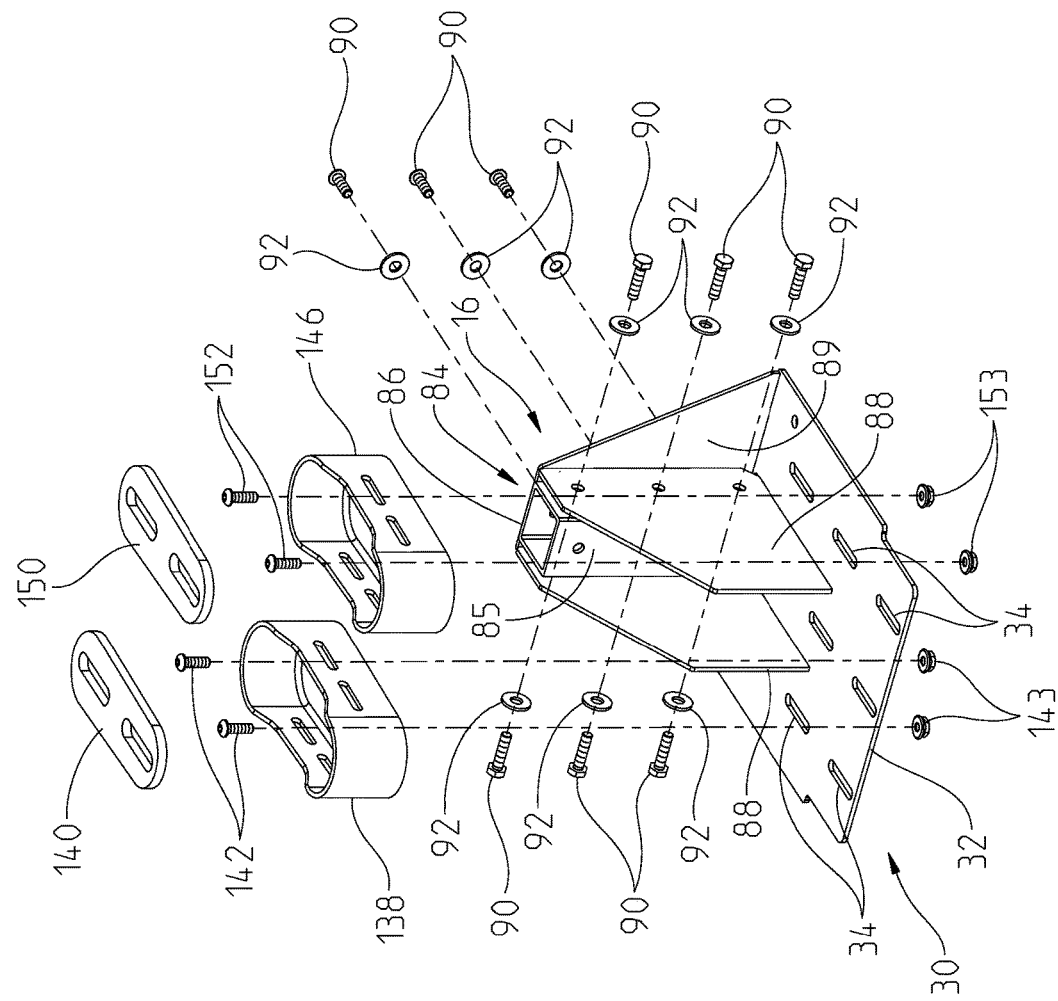
FIG. 6B is an exploded perspective view of the lower portion of the weapon mounting system of FIG. 1.

As shown in FIGS. 6A and 6B, the lower end 80 of the upright 60 is secured within a receiver 84 defined by a rectangular tube or channel 86 of the base 16. Gusset plates 88 and 89 help support and stabilize the tube 86. Fasteners, such as bolts 90 and washers 92 secure the upright 60 within the receiver 84. As further detailed herein, base slide mounts 94, 95 and 96 may threadably receive the bolts 90 to facilitate sliding movement of the upright 60 relative to the base 16. A cap 97 is secured to the upper end 82 of the upright 60 through a fastener, such as a screw 98.

With reference to FIGS. 5-7, a first track 102 extends between the lower end 80 and the upper end 82 in the first side face 72, while a second track 104 extends between the lower end 80 and the upper end 82 in the second side face 74. A third track 106 extends between the lower end 80 and the upper end 82 in the front face 76, while a fourth track 108 extends between the lower end 80 and the upper end 82 in the rear face 78.

Each track 102, 104, 106, 108 is illustratively T-shaped in cross-section, including a main chamber 110 and a slot 112 defined by a pair of opposing walls 114 and 116. An internal web 118 connects the walls 114 and 116 of the different tracks 102, 104, 106, 108.

The slide mounts 94, 95 and 96 are slidably received within tracks 102, 108 and 104, respectively, of the upright 60. In a released mode of operation, clearance is provided between the slide mounts 94, 95 and 96 and the respective washers 92 on opposing sides of the walls 114 and 116 of the tracks 102, 108 and 104. As such, the slide mounts 94 and 96 permit vertical adjustment of the upright 60 relative to the base 16. As the bolts 90 are tightened, the mounts 94, 95 and 96 and the respective washers 92 clamp to the walls 114 and 116, thereby securing the upright 60 to the base 16. In this fixed mode of operation, the slide mounts 94 and 96 are fixed from vertical movement along the tracks 102 and 104 of the upright 60.

With reference to FIGS. 1, 6A and 6B, the first weapon holder 62 is illustratively supported by the first track 102 of the upright 60, and the second weapon holder 64 is illustratively supported by the second track 104 of the upright 60. Illustratively, the first and second weapon holders 62 and 64 each includes a lock mechanism 120 having a base 122 and a pivotal cover 124 coupled to the base 122 for receiving and securing weapon 68, 70 therein. The lock mechanism 120 may comprise an electrically operated lock having a remote user interface or switch (not shown) and a key override 125. Such an illustrative lock mechanism is described in U.S. Pat. No. 4,949,559 to Glines, which is assigned to the assignee of the present invention, and is expressly incorporated by reference herein.

The second weapon holder 64 further illustratively includes a barrel rest 126, including an upper arm 128 supported above the lock mechanism 120, and a lower arm 130 supported below the lock mechanism 120. The upper arm 128 and the lower arm 130 illustratively include aligned openings 132 and 134 configured to receive a barrel 135 of weapon 68.

A first butt housing 138 is supported on the base 16 below the first weapon holder 62 and is configured to receive the butt 139 of weapon 68. A pad 140, illustratively formed of an elastomer, is received within the butt housing 138. The butt housing 138 and the pad 140 are secured to the openings 34 of the mounting platform 32 through conventional fasteners, such as bolts 142 and nuts 143. Similarly, a second butt housing 146 is supported on the base 16 below the second weapon holder 64 and is configured to receive the butt 148 of weapon 70. A pad 150, illustratively formed of an elastomer, is received within the butt housing 146. The butt housing 146 and the pad 150 are secured to the openings 34 of the mounting platform 32 through conventional fasteners, such as bolts 152 and nuts 153.

First accessory slide mounts 154 are received within the first track 102 of the upright 60 and are coupled to the first weapon holder 62. Illustratively, an L-shaped bracket 156 couples the first weapon holder 62 to the first accessory slide mounts 154. A first portion 158 of the bracket 156 is secured to the first weapon holder 62 through fasteners, such as bolts 160 extending through elongated slots 161. A second portion 162 of the bracket 156 is secured to the first accessory slide mount 154 through fasteners, such as bolts 164 extending through elongated slots 165, and washers 166. More particularly, the first accessory slide mounts 154 are configured for sliding movement within the first track 102 and threadably receive the bolts 164. Bolts 160 within slots 161, and bolts 164 within slots 165, permit for translational and rotational adjustment of the first weapon holder 62, thereby facilitating proper alignment of a weapon received therein.

The first accessory slide mounts 154 are supported by the track 102 for sliding movement parallel to the longitudinal axis of the upright 60 in a released mode of operation, and are secured in position relative to the upright 60 in a fixed mode of operation. As such, the first weapon holder 62 is vertically moveable along the upright 60 when the first accessory slide mounts 154 are in the released mode of operation. In the released mode of operation, clearance is provided between the slide mounts 154 and the respective washers 166 on opposing sides of the walls 114 and 116. As the bolts 164 are tightened, the slide mounts 154 and the washers 166 clamp the bracket 156 to the walls 114 and 116, thereby securing the bracket 156 and the first weapon holder 62 to the upright 60. In this fixed mode of operation, the slide mounts 154 and the first weapon holder 62 are fixed from vertical movement along the track 102 of the upright 60.

Second accessory slide mounts 170 are received within the second track 104 of the upright 60 and are coupled to the second weapon holder 64. Illustratively, an L-shaped bracket 172 couples the second weapon holder 64 to the second slide mounts 170. A first portion 174 of the bracket 172 is secured to the second weapon holder 64 and the barrel rest 126 through fasteners, such as bolts 176 extending through elongated slots 177. A second portion 178 of the bracket 172 is secured to the second accessory slide mounts 170 through fasteners, such as bolts 180 extending through slots 181, and washers 182. More particularly, the second accessory slide mounts 170 are configured for sliding movement within the second track 104 and threadably receive the bolts 180. Bolts 176 within slots 177, and bolts 180 within slots 181, permit for translational and rotational adjustment of the second weapon holder 64, thereby facilitating proper alignment of a weapon received therein.

The second accessory slide mounts 170 are supported by the track 104 for sliding movement parallel to the longitudinal axis of the upright 60 in a released mode of operation, and are secured in position relative to the upright 60 in a fixed mode of operation. As such, the second weapon holder 64 is vertically moveable along the upright 60 when the second accessory slide mounts 170 are in the released mode of operation. In the released mode of operation, clearance is provided between the slide mounts 170 and the respective washers 182 on opposing sides of the walls 114 and 116 of the track 104. As the bolts 180 are tightened, the mounts 170 and the washers 182 clamp the bracket 172 to the walls 114 and 116, thereby securing the bracket 172 and the second weapon holder 64 to the upright 60. In this fixed mode of operation, the slide mounts 170 and the second weapon holder 64 are fixed from vertical movement along the track 104 of the upright 60.

The article lock box 66 is supported by the third track 106 of the upright 60. Third accessory slide mounts 188 are received within the third track 106 of the upright and are coupled to the article lock box 66. The article lock box 66 is illustratively secured to the third accessory slide mounts 188 through fasteners, such as bolts 190 and washers 192. More particularly, the slide mounts 188 are configured for sliding movement within the third track 106 and threadably receive the bolts 190.

The third accessory slide mounts 188 are supported by the track 106 for sliding movement parallel to the longitudinal axis of the upright 60 in a released mode of operation, and are secured in position relative to the upright 60 in a fixed mode of operation. In a released mode of operation, clearance is provided between the slide mounts 188 and the respective washers 192 on opposing sides of the walls 114 and 116 of the track 106. As the bolts 190 are tightened, the slide mounts 188 and the washers 192 clamp to the walls 114 and 116 of the track 106, thereby securing the article lock box 66 to the upright 60. In this fixed mode of operation, the slide mounts 188 and the article lock box 66 are fixed from vertical movement along the track 106 of the upright 60.

Illustratively, the article lock box 66 is laterally positioned intermediate the first weapon holder 62 and the second weapon holder 64. The first weapon holder 62 and the second weapon holder 64 are in laterally spaced relation such that the second weapon holder 64 may be positioned horizontally adjacent to the first weapon holder 62 without interference therebetween. As such, the weapon holders 62 and 64 may be independently moved along respective tracks 102 and 104 to any vertical position along the upright 60 to accommodate different weapon types, styles and sizes.

Figure 4:
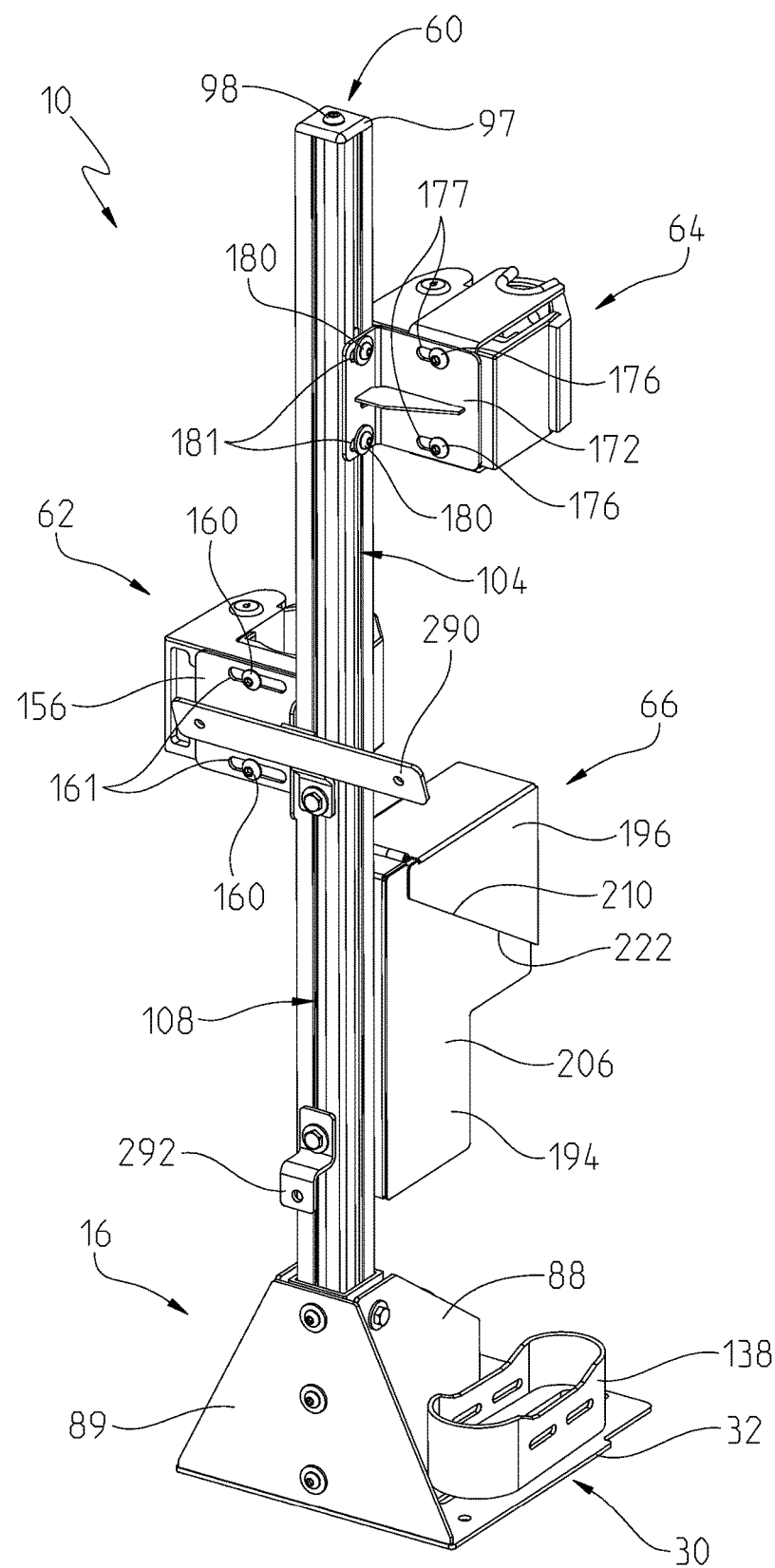
FIG. 4 is a second rear perspective view of the weapon mounting system of FIG. 1.

With reference to FIGS. 8-11, the article lock box 66 illustratively includes a housing 194, and a lid 196 coupled to the housing 194 by a hinge 198 for pivoting movement between a closed (lowered) position and an open (raised) position. The housing 194 includes a front wall 200, a rear wall 202, a first side wall 204, and a second side wall 206. The side walls 204 and 206 include angled upper edges 208 and 210. The lid 196 includes an upper wall 212, a front wall 214, a first side wall 216 and a second side wall 218. The side walls 216 and 218 include angled lower edges 220 and 222 that cooperate with the angled upper edges 208 and 210 of the housing 194 (FIG. 4). The angled interface between edges 208, 210 and 220, 222 of the housing 194 and the lid 196 facilitate access to the interior of the housing 194 when the lid 196 is in its raised or open position to insert and remove articles, including handguns, evidence, handcuffs, etc. The interior of the housing 194 may include an enlarged upper portion and a narrowed lower portion to conform to the general shape of a handgun.

Figure 10:
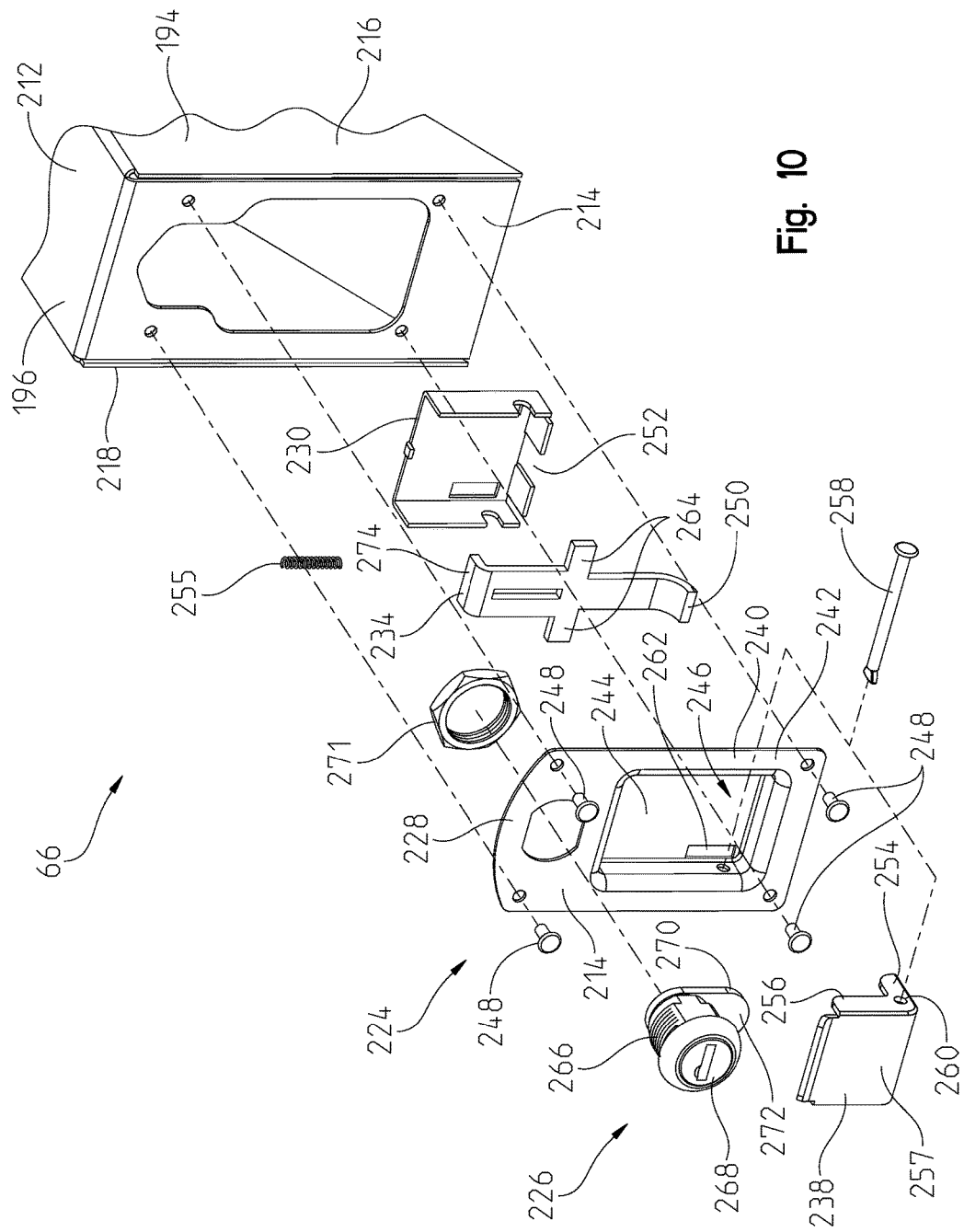
FIG. 10 is a partial exploded perspective view of the article lock box of FIG. 8.
Figure 11:
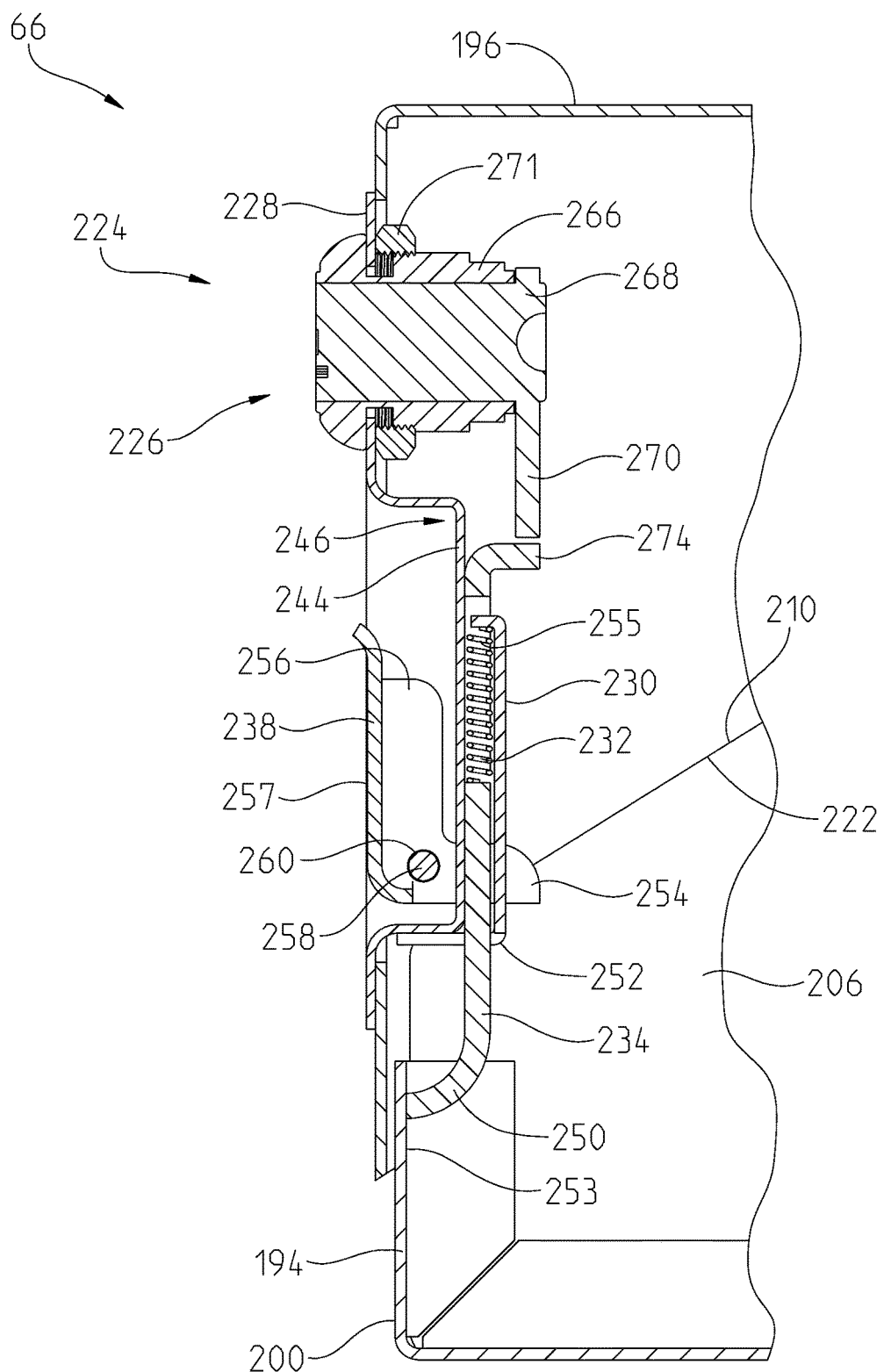
FIG. 11 is a cross-sectional view taken along line 11-11 of FIG. 2.

With reference to FIGS. 10 and 11, the article lock box 66 further includes a latch 224 to couple the lid 196 to the housing 194 in its closed position. The latch 224 includes a lock 226 to secure the lid 196 in the closed position.

The latch 224 includes a pair of connected pan and housing members 228 and 230 providing a guideway 232, a bolt 234 movable in the guideway 232, and a pivotable actuating member or handle 238 for causing actuation of the bolt 234. The pan member 228 comprises a formed mounting plate 240 having a laterally extending flange 242 and a pan portion 244 defining a recess 246. Fasteners, such as bolts 248, secure the pan member 228 to the lid 196.

The bolt 234 illustratively includes a locking portion 250 which projects from the guideway 232 through an end opening 252 of the housing member 230 and is engageable with a striker plate 253 when the lid 196 is pivoted to its closed position. The bolt 234 is slidable within the guideway 232. A compression spring 255 cooperates with the bolt 234 for urging the bolt 234 in a direction to project the locking portion 250 outwardly from the housing member 230.

The handle 238 illustratively includes a substantially flat plate portion 257 which is normally in a substantially flush relation to the top of the flange 242. The handle 238 includes a pair of actuating projections or fingers 254 formed as integral projections of edge flanges 256.

The handle 238 is located in the recess 246 of the pan member 228 and is pivotably supported on a transverse hinge pin 258 which extends through a pair of aligned holes 260 of the edge flanges 256. The handle 238 is disposed with its actuating fingers 254 extending through slots 262 and across the guideway 232.

The fingers 254 are engaged by thrust arms 264 of the bolt 234 and, during pivoting of the handle 238 outwardly of the recess 246 of the pan portion 244, the fingers 254 impart a retracting movement to the bolt 234 and cause movement thereof inwardly of the guideway 232 in opposition to the spring 255. When the handle 238 is released, the spring 255 imparts an outward movement to the bolt 234 which, in turn, causes an inward pivoting movement of the handle 238 to its normally flush position with the flange 242 of the pan member 228.

The latch 224 further includes key-actuated lock 226 and illustratively includes a support sleeve 266 having a lock barrel 268 rotatably supported therein and carrying a locking arm 270. The sleeve 266 is illustratively secured to the pan member 228 by a nut 271. The locking arm 270 is secured to the rear end of barrel 268 and is rotatable to locate its free end 272 in a substantially abutting relation to an upper end 274 of the bolt 234. When the locking arm 270 is in this aligned relation, refraction of the bolt 234 is prevented. However, when the locking arm 270 is rotated to its unlocked position by means of a key (not shown) rotating the barrel 268, the bolt 234 is free for retracting movement by the handle 238.

Additional details of the illustrative latch 224 are provided in U.S. Pat. No. 2,900,204 to Pelcin, which is expressly incorporated by reference herein.

Figure 12:
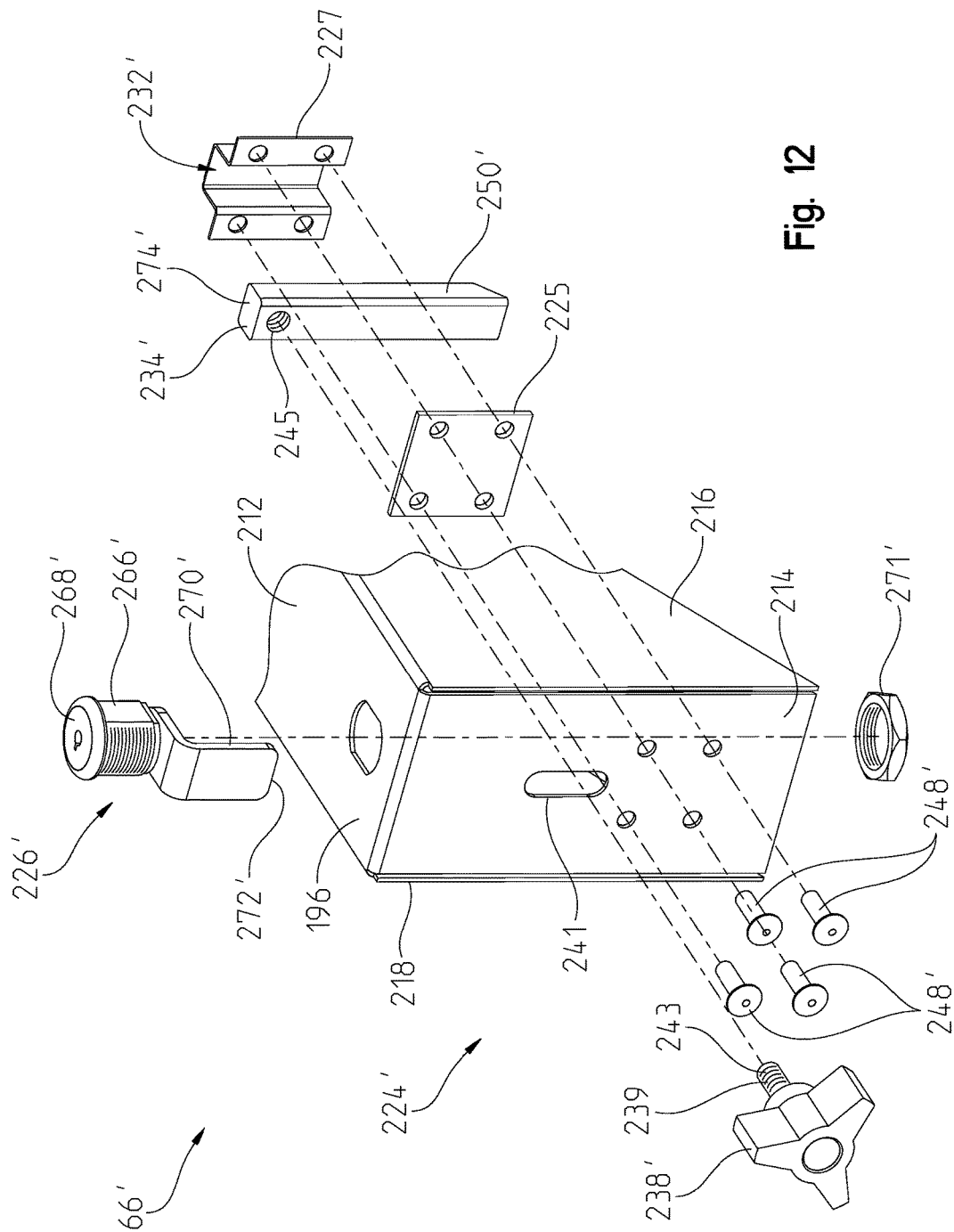
FIG. 12 is a partial exploded perspective view of a further illustrative article lock box.
Figure 13:
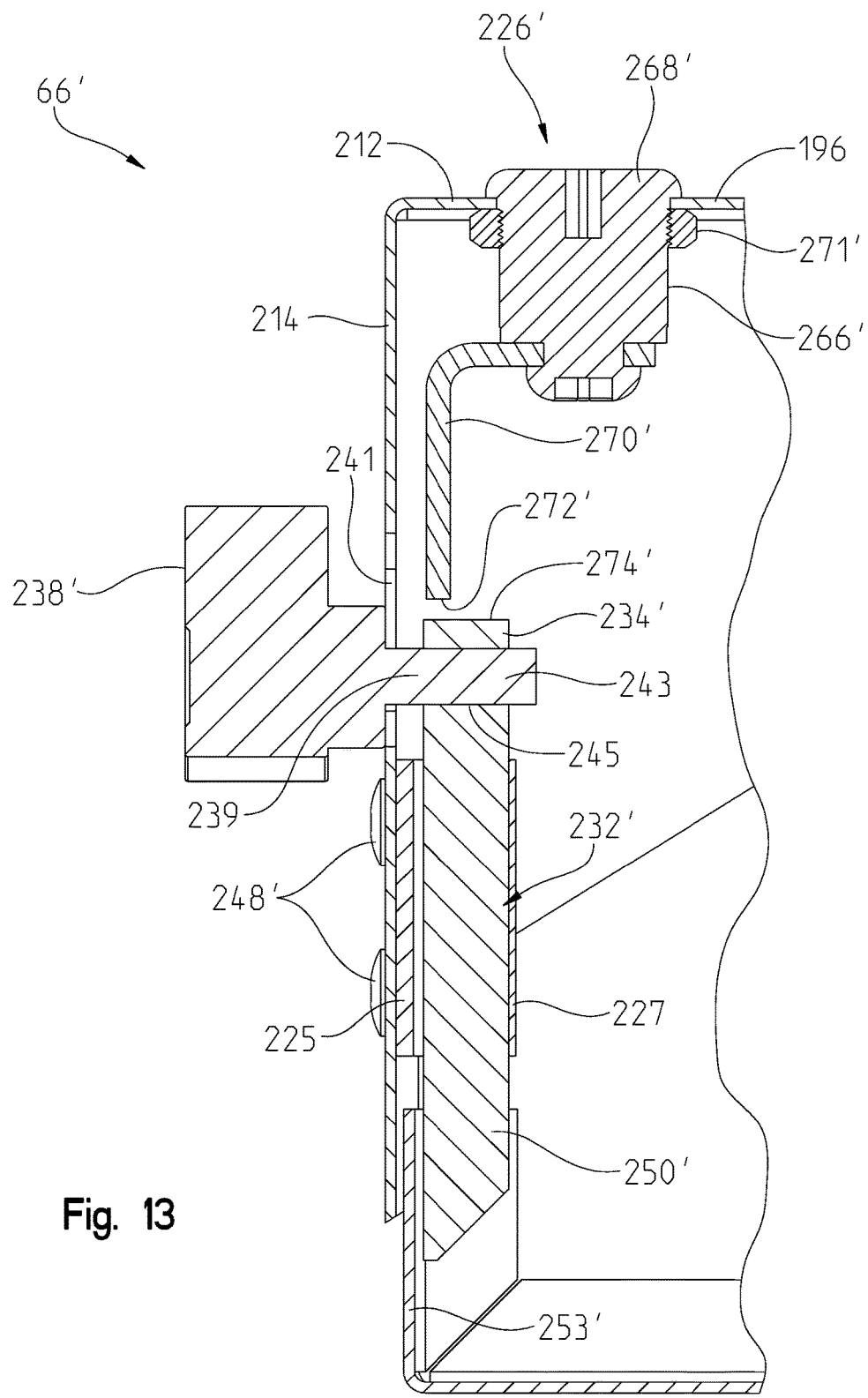
FIG. 13 is a cross-sectional view of the article lock box of FIG. 12.

FIGS. 12 and 13 show a further illustrative article lock box 66' including an alternative embodiment latch 224' to couple the lid 196 to the housing 194 in its closed position. The latch 224' includes a lock 226' to secure the lid 196 in the closed position.

The latch 224' includes a base 225 and a guide member 227 providing a guideway 232', a bolt 234' vertically movable in the guideway 232', and an actuating member or knob 238' for causing actuation of the bolt 234'. Fasteners, such as rivets 248', secure the base 225 and the guide member 227 to the front wall 214 of the lid 196.

The bolt 234' is slidable within the guideway 232' from a lowered position (FIG. 13) to a raised position. The bolt 234' illustratively includes a locking portion 250' which projects downwardly from the guideway 232' and is engageable with a striker plate 253' when the lid 196 is pivoted to its closed position and the bolt 234' is in its lowered position.

The knob 238' includes a shaft 239 extending through an elongated slot 241 formed within the front wall 214 and having a threaded end 243 received within a threaded opening 245 in the bolt 234'. Rotating the knob 238' in a first direction (e.g., clockwise) tightens secures the bolt 234' to the front wall 214, thereby preventing movement within the guideway 232'. Rotating the knob 238' in a second direction (e.g., counter-clockwise) loosens the bolt 234', thereby preventing movement within the guideway 232'. When in its lowered position, the bolt 234' engages the striker plate 253' to prevent opening of the lid 196 (FIG. 13).

The latch 224' further includes key-actuated lock 226', illustratively including a support sleeve 266' having a lock barrel 268' rotatably supported therein and carrying a locking arm 270'. The sleeve 266' is illustratively secured to the upper wall 212 of the lid 196 by a nut 271'. The locking arm 270' is secured to the rear end of barrel 268' and is rotatable to locate its free end 272' in a substantially abutting relation to an upper end 274' of the bolt 234'. When the locking arm 270' is in this aligned relation, upward movement of the bolt 234' is prevented. However, when the locking arm 270' is rotated to its unlocked position by means of a key (not shown) rotating the barrel 268', the bolt 234' is free for upward movement by the knob 238'.

In certain illustrative embodiments, the lock mechanisms 120 of the first weapon holder 62 and the second weapon holder 64, and the lock 226, 226' may all comprise electrically operated locks having a remote user interface or switch (not shown). More particularly, the remote user interface may include a momentary switch to unlock some or all of the locks of the weapon holders 62 and 64 and the article lock box 66, 66'.

Figure 2:
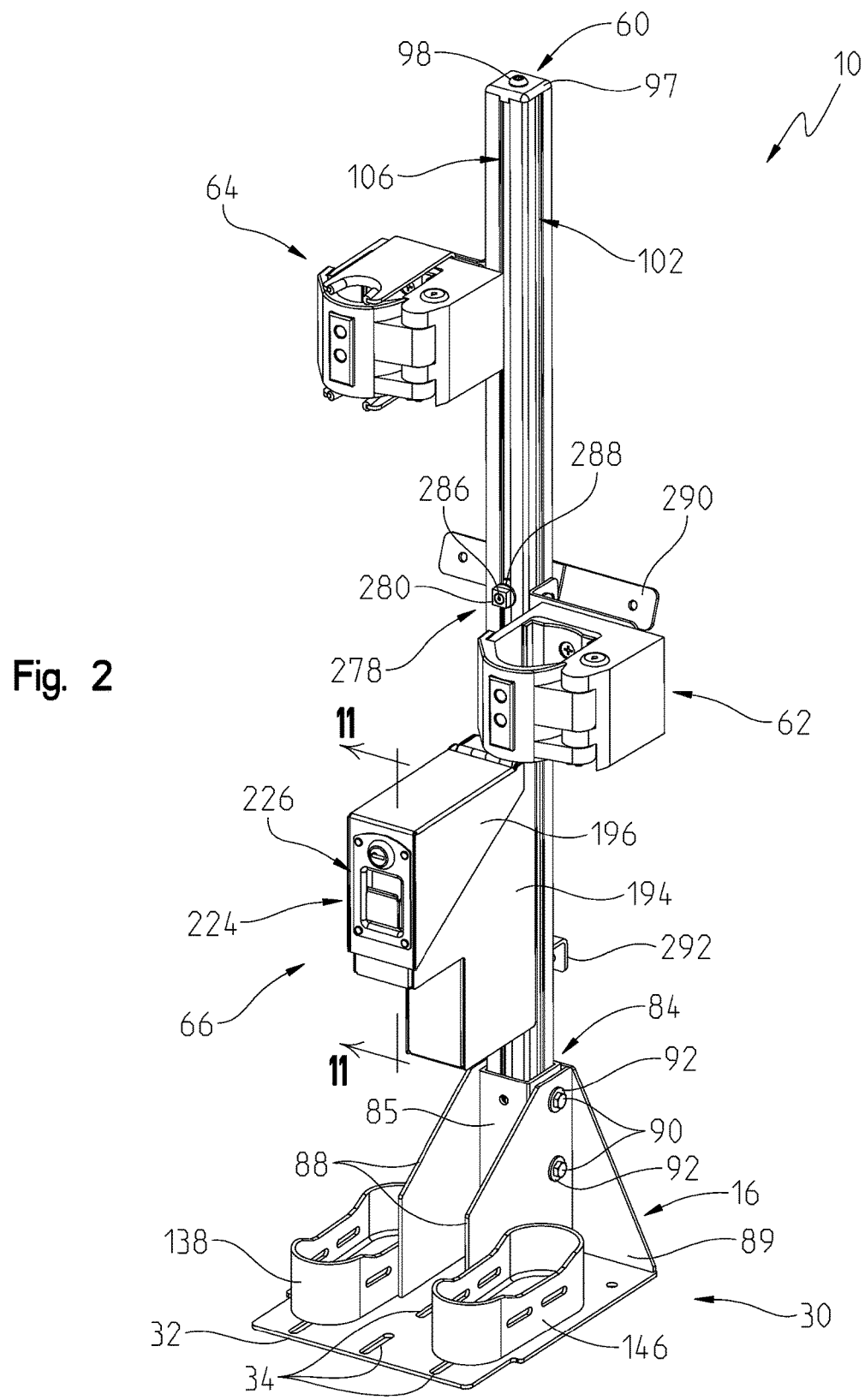
FIG. 2 is a front perspective view of the weapon mounting system of FIG. 1.
Figure 3:
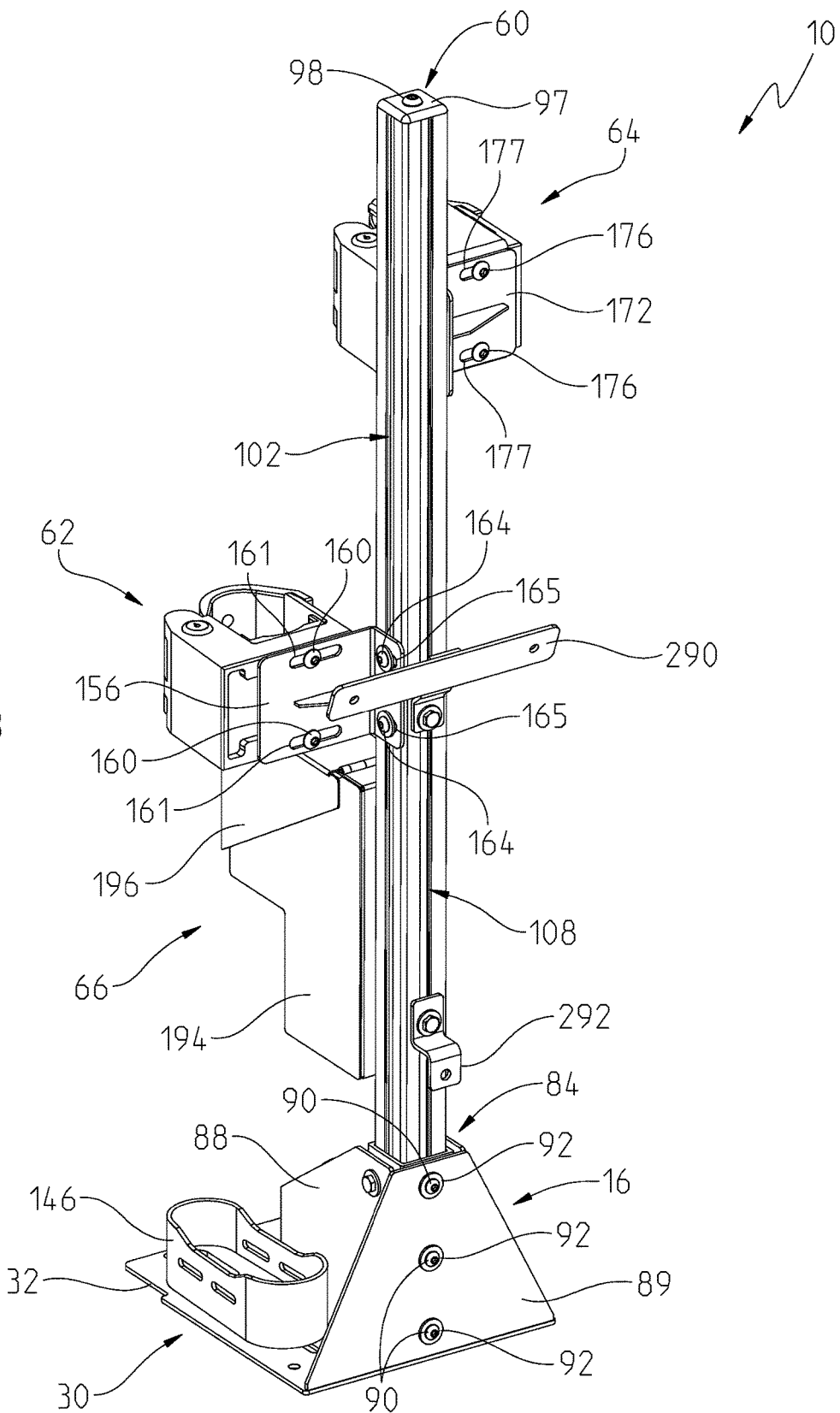
FIG. 3 is a first rear perspective view of the weapon mounting system of FIG. 1.

With reference to FIGS. 2 and 6A, a releasable coupler 278 is supported by the upright 60 and is configured to cooperate with the article lock box 66 to releaseably secure the lid 196 in the raised or open position. In one illustrative embodiment, the releasable coupler 278 includes a magnet 280 supported by a slide mount 282 received within the front track 106 of the upright 60. A fastener, such as a bolt 286 and a washer 288, secures the magnet 280 to the slide member 282.

In a released mode of operation, clearance is provided between the slide mount 282 and the washer 288 on opposing sides of the walls 114 and 116 of the front track 106. As the bolts 286 are tightened, the mount 282 and the washer 288 clamp to the walls 114 and 116, thereby securing the magnet 280 to the upright 60. In this fixed mode of operation, the slide mount 282 is fixed from vertical movement along the track 106 of the upright 60.

The weapon mounting system 10 may be configured for vehicle partition mounting or self-supported mounting (e.g., through base 16). With reference to the illustrative embodiments of FIGS. 3-6, first (upper) and second (lower) mounting brackets 290 and 292 may couple the rear face 78 of the upright 60 to vehicle partition 24 in the vehicle partition mounting configuration. A fourth slide mount 294 may be received within the fourth track 108 of the upright 60 and is coupled to the first mounting bracket 290, illustratively through a fastener, such as a bolt 298 and washer 300. The first mounting bracket 290 may comprise a T-shaped member including apertures 302 to receive conventional fasteners (not shown) to couple to the partition 24.

In a released mode of operation, clearance is provided between the slide mount 294 and the washer 300 on opposing sides of the walls 114 and 116 of the track 108. As the bolt 298 is are tightened, the mount 294 and the washer 300 clamp to the walls 114 and 116, thereby securing the bracket 290 to the upright 60. In this fixed mode of operation, the slide mounts 294 is fixed from vertical movement along the track 108 of the upright 60.

A fifth slide mount 304 may be received within the fourth track 108 of the upright 60 below the fourth slide mount 294.

The second mounting bracket 292 is coupled to the fifth slide mount 304, illustratively through a fastener, such as a bolt 306 and washer 308. The second mounting bracket 292 includes an aperture 310 to receive a conventional fastener (not shown) to couple to the partition 24.

In a released mode of operation, clearance is provided between the slide mounts 304 and the washer 308 on opposing sides of the walls 114 and 116 of the track 108. As the bolt 306 is tightened, the mount 294 and the washer 308 clamp to the walls 114 and 116, thereby securing the bracket 292 to the upright 60. In this fixed mode of operation, the slide mount 304 is fixed from vertical movement along the track 108 of the upright 60.

As may be appreciated, the weapon mounting system 10 provides for mounting flexibility in weapon type, weapon style and/or weapon accessories through the plurality of adjustable mounting locations (e.g., weapon holders 62 and 64, and article lock box 66). More particularly, the weapon mounting locations may be configured at the time of installation with simple adjustments.

While the above detailed description and accompanying drawings illustrate weapon holders 62 and 64 and article lock box 66 coupled to the upright 60, other accessories may be supported by one or more of the tracks 102, 104, 106, 108. More particularly, the tracks 102, 104, 106, 108 of the upright 60 may support a variety of different modular accessories instead of, or in addition to the weapon holders 62 and 64 and the article lock box 66. Such accessories may comprise, for example, a flashlight holder, a hook to support a jacket and/or a hat, a cup holder, and a support tray or platform.

The flashlight holder illustratively includes a cradle configured to hold a flashlight and a charger coupled to an electrical system of the vehicle 14 through wires extending through the upright 60, wherein the charger is configured to charge batteries of a flashlight when docked within the cradle. The support tray or platform may be configured to support electronic devices, such as a ticket machine or printer for use by an individual supported by the front driver seat 20 and/or front passenger seat 22 of the vehicle 14.

Although the invention has been described in detailed with reference to certain preferred embodiments, variations of modifications exist within the spirit and scope of the invention as described and defined in the following claims.

The invention claimed is:

1. A weapon mounting system comprising:
   an upright extending upwardly relative to a floor of a vehicle, the upright including a lower end, an upper end, a first track extending between the lower end and the upper end, and a second track spaced apart from the first track and extending between the lower end and the upper end;
   a first weapon holder supported by the upright;
   a first slide mount received within the first track of the upright and coupled to the first weapon holder, wherein the first slide mount is supported by the first track for sliding movement in a released mode of operation, and the first slide mount is secured in position in a fixed mode of operation, such that the first weapon holder is vertically movable along the upright when the first slide mount is in the released mode of operation;
   a first bracket coupled to the first weapon holder and the first slide mount, the first weapon holder supported for translational and rotational adjustment relative to the first bracket; and
   an article lock box coupled to the upright, wherein the article lock box includes a housing, a lid coupled to the housing for pivoting movement between a lowered, closed position and a raised, open position, and a lock to secure the lid in the closed position.

2. The weapon mounting system of claim 1, wherein the first weapon holder includes a lock mechanism having a base and a pivotal cover coupled to the base for receiving and securing a weapon therein.

3. The weapon mounting system of claim 1, further comprising a second weapon holder supported by the upright, and a second slide mount received within the second track of the upright and coupled to the second weapon holder, wherein the second weapon holder includes a lock mechanism having a base and a pivotal cover coupled to the base for receiving and securing a weapon therein, and the second weapon holder further includes a barrel rest including an upper arm supported above the lock mechanism, and a lower arm supported below the lock mechanism, the upper arm and the lower arm including aligned openings for receiving a barrel of a weapon.

4. The weapon mounting system of claim 1, further comprising:
   a second weapon holder supported by the upright;
   a second slide mount received within the second track of the upright and coupled to the second weapon holder;
   wherein the second slide mount is supported by the track for sliding movement in a released mode of operation, and the second slide mount is secured in position in a fixed mode of operation, such that the second weapon holder is vertically movable along the upright when the second slide mount is in the released mode of operation; and
   wherein the second weapon holder is adjustable along the upright independent of the first weapon holder, the second weapon holder being in laterally spaced relation to the first weapon holder such that the second weapon holder is configured to be positioned horizontally adjacent the first weapon holder without interference therebetween.

5. The weapon mounting system of claim 4, wherein the article lock box is laterally positioned intermediate the first weapon holder and the second weapon holder.

6. The weapon mounting system of claim 1, further comprising a base member configured to be supported by a floor of a vehicle, the upright extending upwardly from the base member.

7. The weapon mounting system of claim 6, further comprising a butt housing supported on the base member below the first weapon holder configured to receive the butt of a weapon.

8. The weapon mounting system of claim 1, wherein the article lock box further includes a latch including a handle.

9. The weapon mounting system of claim 1, further comprising a releasable coupler supported by the upright and configured to cooperate with the article lock box to releasably secure the lid in the open position.

10. The weapon mounting system of claim 9, wherein the releasable coupler comprises a magnet.

11. A weapon mounting system comprising:
    an upright including a rectangular cross-section having a front face, a rear face, a first side face, a second side face, a lower end, an upper end, a first track extending between the lower end and the upper end in the first side face, and a second track extending between the lower end and the upper end in the second side face;
    a first weapon holder supported by the upright;

a first slide mount received within first track and coupled to the first weapon holder, wherein the first weapon holder is adjustable along the upright;

a first bracket coupled to the first weapon holder and the first slide mount, the first weapon holder supported for horizontal adjustment relative to the first bracket;

a second weapon holder supported by the upright;

a second slide mount received within second track and coupled to the second weapon holder, wherein the second weapon holder is adjustable along the upright independent of the first weapon holder; and a second bracket coupled to the second weapon holder and the second slide mount, the second weapon holder supported for horizontal adjustment relative to the second bracket;

the second weapon holder being in laterally spaced relation to the first weapon holder such that the second weapon holder is configured to be positioned horizontally adjacent the first weapon holder without interference therebetween.

12. The weapon mounting system of claim 11, further comprising an article lock box, and a third slide mount, wherein the upright further includes a third track extending between the lower end and the upper end in the front face, and the third slide mount is received within the third track wherein the article box is adjustable along the upright.

13. The weapon mounting system of claim 11, further comprising a rear bracket to couple the upright to a vehicle partition.

14. The weapon mounting system of claim 11, wherein the first weapon holder includes a lock mechanism having a base and a pivotal cover coupled to the base for receiving and securing a weapon therein.

15. The weapon mounting system of claim 11, wherein the second weapon holder includes a lock mechanism having a base and a pivotal cover coupled to the base for receiving and securing a weapon therein, and the second weapon holder further includes a barrel rest including an upper arm supported above the lock mechanism, and a lower arm supported below the lock mechanism, the upper arm and the lower arm including aligned openings for receiving a barrel of a weapon.

16. The weapon mounting system of claim 11, further comprising a base member configured to be supported by a floor of a vehicle, the upright extending upwardly from the base member.

17. The weapon mounting system of claim 16, further comprising a butt housing supported on the base member below the first weapon holder configured to receive the butt of a weapon.

18. The weapon mounting system of claim 11, wherein the article lock box includes a housing, a lid coupled to the housing for pivoting movement between a closed position and an open position, and a lock to secure the lid in the closed position.

19. The weapon mounting system of claim 18, further comprising a releasable coupler supported by the upright and configured to cooperate with the article lock box to releasably secure the lid in the open position.

20. A weapon mounting system comprising:

a base member configured to be supported by a floor of a vehicle;

an upright extending upwardly from the base member in a vertical direction, the upright including a lower end, an upper end, a front face, a rear face, a first side face, and a second side face, a first track extending between the lower end and the upper end in the first side face, a second track extending between the lower end and the upper end in the second side face, and a third track extending between the lower end and the upper end in the front face;

a first weapon holder supported by the upright;

a first slide mount received within first track and coupled to the first weapon holder, wherein the first weapon holder is adjustable along the upright;

a second weapon holder supported by the upright; and a second slide mount received within second track and coupled to the second weapon holder, wherein the second weapon holder is adjustable along the upright;

an article lock box supported by the upright;

a third mount received within the third track and coupled to the article lock box, wherein the article lock box is adjustable along the upright; and wherein the article lock box includes a housing, a lid coupled to the housing for pivoting movement between a closed position and an open position, and a lock to secure the lid in the closed position.

\* \* \* \* \*